United States Patent [19]
Tonozuka et al.

[11] Patent Number: 5,650,940
[45] Date of Patent: Jul. 22, 1997

[54] PROCESS MONITORING SYSTEM WITH REMOTE SUPERVISION

[75] Inventors: Yoshikazu Tonozuka; Manabu Matsumae, both of Tokyo, Japan

[73] Assignee: Kabushiki Kaisha Toshiba, Tokyo, Japan

[21] Appl. No.: 421,963

[22] Filed: Apr. 14, 1995

Related U.S. Application Data

[63] Continuation-in-part of Ser. No. 965,847, Oct. 23, 1992, abandoned.

[30] Foreign Application Priority Data

Oct. 25, 1991 [JP] Japan .................................. 3-279973
Oct. 8, 1992 [JP] Japan .................................. 4-270206

[51] Int. Cl.$^6$ .................................................. G08B 5/22
[52] U.S. Cl. ................ 364/514 C; 340/539; 340/825.06; 364/550
[58] Field of Search ....................... 340/715, 717, 340/825.06, 539; 364/514, 550, 514 C

[56] References Cited

U.S. PATENT DOCUMENTS

| | | | |
|---|---|---|---|
| 3,899,772 | 8/1975 | Mead et al. | 340/825.55 |
| 3,976,995 | 8/1976 | Sebestyen | 340/825.44 |
| 4,001,807 | 1/1977 | Dallimonti | 364/189 |
| 4,009,375 | 2/1977 | White et al. | 364/436 |
| 4,109,309 | 8/1978 | Johnstone et al. | 364/474.11 |
| 4,980,806 | 12/1990 | Taylor et al. | 364/132 |
| 5,131,019 | 7/1992 | Sheffer et al. | 379/59 |
| 5,168,269 | 12/1992 | Harlan | 364/188 |
| 5,200,987 | 4/1993 | Gray | 379/40 |
| 5,347,449 | 9/1994 | Meyer et al. | 364/185 |

OTHER PUBLICATIONS

PC Anywhere III user Guide, Dynamic Microprocessor Association Inc., Huntington, N.Y. Release 3.11a Jan. 1, 1990.

*Primary Examiner*—Emanuel T. Voeltz
*Assistant Examiner*—Craig Steven Miller
*Attorney, Agent, or Firm*—Oblon, Spivak, McClelland, Maier & Neustadt, P.C.

[57] ABSTRACT

A process monitoring system capable of notifying the occurrence of the abnormality in the process to be monitored and providing the information concerning the abnormality to the supervising personnel located at a remote location from the central monitoring room. In addition to a usual central monitoring device and a display provided in a central monitoring room, the system includes a portable monitoring device to be carried by a supervising personnel located at a remote location from the central process monitoring room and connected with the central monitoring device through a data transmission path, for receiving the notification and the information outputted by the central monitoring device at the remote location through the data transmission path, and transmitting an operation command for operating monitoring target devices involved in the process to be monitored, including those monitoring target devices which are distanced from the remote location, in response to which the central monitoring device carries out the step by step execution of an automatic operation of the monitoring target devices or an independent manual operation of each monitoring target device.

20 Claims, 11 Drawing Sheets

FIG.12

| DEVICE 1 | CONDITION 1 | CONDITION 2 | ......... | DEVICE 2 | CONDITION 1 | CONDITION 2 | ......... | DEVICE n | CONDITION 1 | CONDITION 2 | ......... | CONDITION m |

FIG.11

| STEP 1 | DEVICE TO BE OPERATED 1 | OPERATION COMMAND | DEVICE TO BE OPERATED 2 | OPERATION COMMAND | ......... | STEP 2 | DEVICE TO BE OPERATED 1 | OPERATION COMMAND | DEVICE TO BE OPERATED 2 | OPERATION COMMAND | ......... | STEP n | DEVICE TO BE OPERATED 1 | OPERATION COMMAND | DEVICE TO BE OPERATED 2 | OPERATION COMMAND | ......... | DEVICE TO BE OPERATED m | OPERATION COMMAND |

FIG.15

| TYPE | START CONDITION | WORK SITE (1) | CENTER (2) | | NOTE |
|---|---|---|---|---|---|
| COMMON | INTAKE WELL WATER LEVEL ≧ L | ○ | ○ | | |
| | NO OTHER PUMP CURRENTLY ACTIVE | | ○ | | |
| | WATER SUPPLY WELL WATER LEVEL ≦ H | ○ | ○ | | |
| | | | | | |
| | INTAKE VALVE IN LINKED MODE | | ○ | | ONLY FOR 1ST PUMP |
| | INTAKE VALVE IN NORMAL STATE | | ○ | | ONLY FOR 1ST PUMP |
| | | | | | |
| | | | | | |
| INDIVIDUAL | PROTECTION RELAY NOT OPERATING | ○ | ○ | | |
| | NOT IN ACTIVATION OPERATION | ○ | ○ | | |
| | NOT IN STOPPING OPERATION | ○ | ○ | | |
| | | | | | |
| | | | | | |
| | | | | | |
| | | | | | |
| | | | | | |
| | | | | | |
| | | | | | |

PROCESS MONITORING SYSTEM WITH REMOTE SUPERVISION

This is a continuation-in-part application of our earlier, commonly assigned application Ser. No. 07/965,847 filed Oct. 23, 1992, which is now abandoned.

BACKGROUND OF THE INVENTION

1. Field of the Invention

The present invention relates to a system for monitoring a process such as an operation process in a water supply and drainage facility, a building facility, a factory facility, an industrial plant, etc.

2. Description of the Background Art

A conventional process monitoring system for monitoring a process such as an operation process in a water supply and drainage facility, a building facility, a factory facility, an industrial plant, etc. has been achieving the monitoring by displaying the operation states of the various equipments such as a pump, motor, etc. involved in the process to be monitored, on a display device such as CRT located inside a central monitoring room. Such a conventional process monitoring system typically has a configuration as shown in FIG. 1.

This conventional process monitoring system of FIG. 1 comprises: a CRT display device 30 for displaying information to a supervising personnel; and a computer based central monitoring device 20 having a process monitor unit 22 for carrying out a monitoring operation with respect to a process to be monitored 10, a display control unit 21 for controlling the information to be displayed on the CRT display device 30 according to the result of the monitoring operation carried out by the process monitor unit 22, and a memory unit 23 for storing various data and programs necessary for the operation of the process monitor unit 22 and the display control unit 21.

In this conventional process monitoring system, with respect to the process to be monitored 10 which involves operations of various equipments and sensors, the central monitoring device 20 collects various data on the process to be monitored 10 at predetermined timings. When the abnormality is detected in the process to be monitored 10, the central monitoring device 20 notifies the occurrence of the abnormality to the supervising personnel watching the CRT display device 30, by displaying information concerning the occurrence of the abnormality on a CRT display device 30, such that the supervising personnel can take care of the abnormality in the process to be monitored 10 appropriately and quickly, according to the information displayed on the CRT display device 30.

However, in such a conventional process monitoring system, the CRT display device 30 has been located inside a central monitoring room in which the supervising personnel is stationed, and the notification of the occurrence of the abnormality in the process to be monitored 10 is made only by the display on this CRT display device 30 so that it is necessary for the supervising personnel to be permanently stationed in the central monitoring room and to keep a constant watch over the CRT display device 30, especially in a case the process to be monitored 10 is important.

On the other hand, in a case the abnormality occurs while the supervising personnel is out of the central monitoring room. It is necessary for the supervising personnel to go to the central monitoring room in order to see the information concerning the abnormality on the CRT display device 30, no how far away from the central monitoring room the supervising personnel has been present.

Thus, the conventional process monitoring system has been associated with the drawback that it demands very hard work for the supervising personnel, as the notification of the occurrence of the abnormality in the process to be monitored and the information concerning the abnormality can be given to the supervising personnel at the central monitoring room alone.

SUMMARY OF THE INVENTION

It is therefore an object of the present invention to provide a process monitoring system capable of notifying the occurrence of the abnormality in the process to be monitored and providing the information concerning the abnormality to the supervising personnel located at a remote location from the central monitoring room in real time, such that the work demanded on the supervising personnel can be reduced.

According to one aspect of the present invention there is provided a process monitoring system, comprising: a central monitoring device for monitoring a: state of a process to be monitored, which outputs a notification of an occurrence of abnormality in the process to be monitored and information on the abnormality when the occurrence of the abnormality in the process to be monitored is detected; a display means, located in a central process monitoring room, for displaying the notification and the information outputted by the central monitoring device; and a portable monitoring device, to be carried by a supervising personnel located at a remote location from the central process monitoring room and connected with the central monitoring device through a data transmission path, for receiving the notification and the information outputted by the central monitoring device at the remote location and transmitting an operation command for operating monitoring target devices involved in the process to be monitored, including those monitoring target devices which are distanced from the remote location, through the data transmission path; wherein the central monitoring device includes: automatic operation step execution means for executing an automatic operation of the monitoring target devices step by step while checking a prescribed step execution condition for each step, in response to the operation command transmitted from the portable monitoring device; and work site manual operation support means for executing an independent manual operation of each monitoring target device while checking a prescribed device operation condition for each monitoring target device, in response to the operation command transmitted from the portable monitoring device.

According to another aspect of the present invention there is provided a method of process monitoring, comprising the steps of: monitoring a process to be monitored by central monitoring device for monitoring a state of the process to be monitored; outputting a notification of an occurrence of abnormality in the process to be monitored and information on the abnormality from the central monitoring device when the occurrence of the abnormality in the process to be monitored is detected by the central monitoring device; displaying the notification and the information outputted from the central monitoring device on display means located in a central process monitoring room; providing a portable monitoring device to be carried by a supervising personnel located at a remote location from the central process monitoring room and connected with the central monitoring device through a data transmission path, for receiving the notification and the information outputted by the central monitoring device; and receiving the notification and the information outputted from the central monitoring device by the portable monitoring device at the remote location through the data transmission path; transmitting an operation command for operating monitoring target devices involved in the process to be monitored, including those monitoring target devices which are distanced from the remote location, from the portable monitoring device through the data transmission path; executing at least one of an automatic operation of the monitoring target devices step by step while checking a prescribed step execution condition for each step, and an independent manual operation of each monitoring target device while checking a prescribed device operation condition for each monitoring target device, at the central monitoring device, in response to the operation command transmitted from the portable monitoring device.

Other features and advantages of the present invention will become apparent from the following description taken in conjunction with the accompanying drawings.

BRIEF DESCRIPTION OF THE DRAWINGS

FIG. 11 is an illustration of a step execution reference table used by an automatic operation step execution unit in the work site operation support unit of FIG. 8.

FIG. 12 is an illustration of a device operation condition table used by an automatic operation step execution unit in the work site operation support unit of FIG. 8.

FIG. 15 is an illustration of an exemplary display for presenting a start condition at the exemplary work site of FIG. 14 by a portable monitoring device of the process monitoring system according to the present invention

DETAILED DESCRIPTION OF THE PREFERRED EMBODIMENTS

Figure 1:
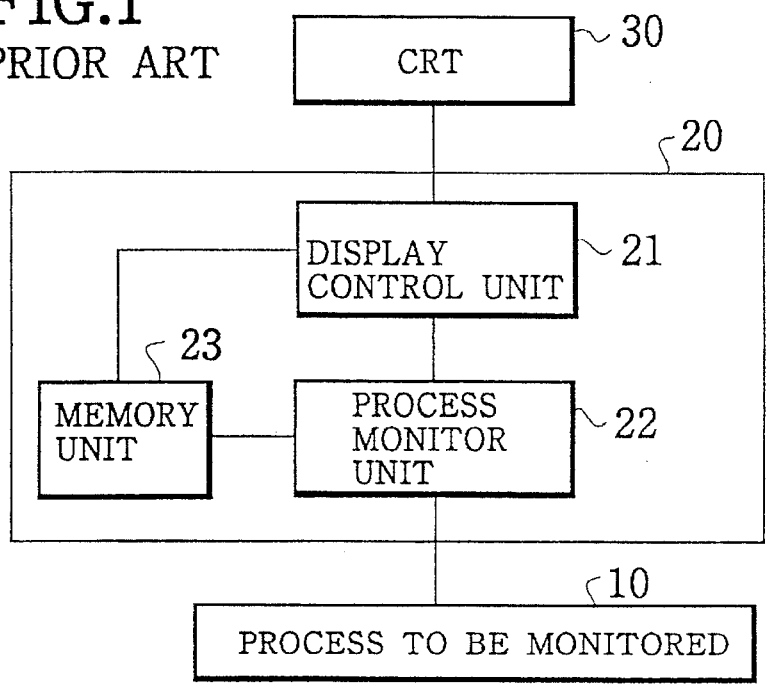
FIG. 1 is a schematic block diagram of a conventional process monitoring system.
Figure 2:
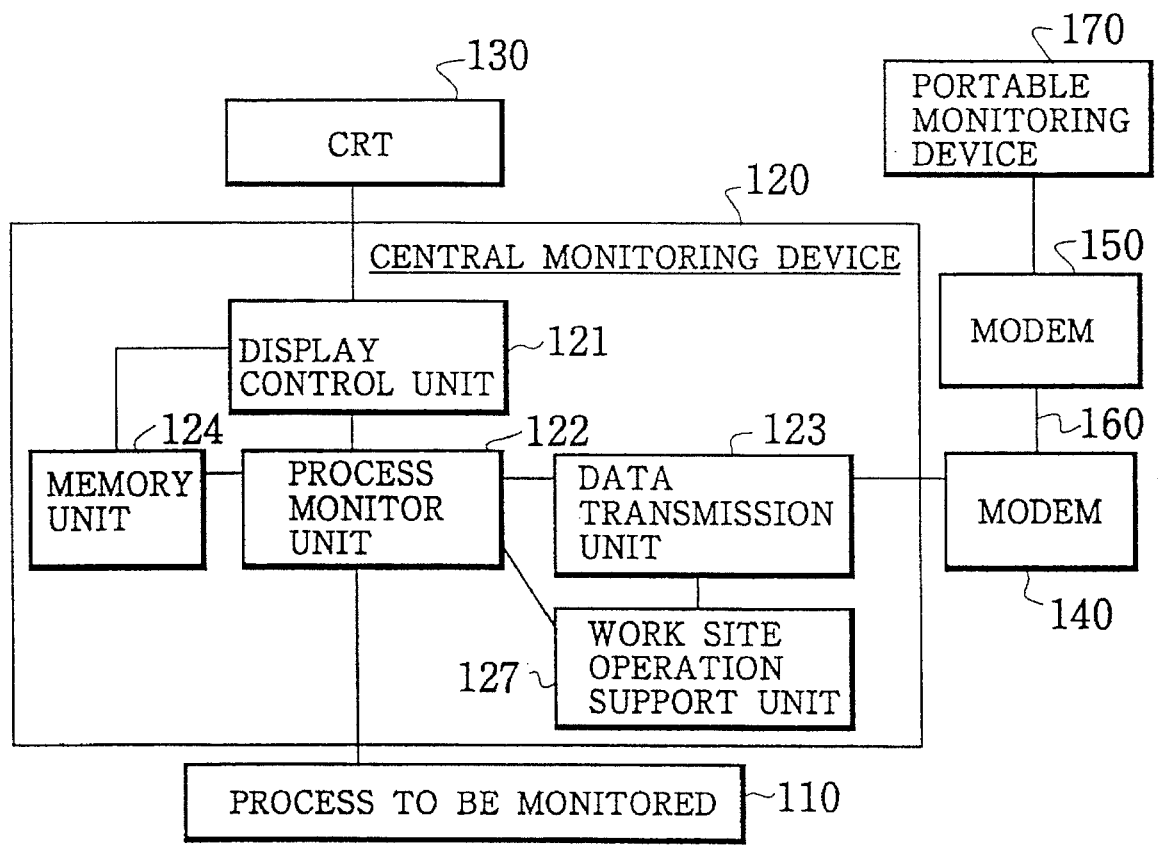
FIG. 2 is a block diagram of a first embodiment of a process monitoring system according to the present invention.

Referring now to FIG. 2, a first embodiment of a process monitoring system according to the present invention will be described in detail.

This process monitoring system of FIG. 2 comprises: a CRT display device 130 for displaying information to a supervising personnel located in a central monitoring room; and a computer based central monitoring device 120, where the central monitoring device 120 further comprises: a process monitor unit 122 for carrying out a monitoring operation with respect to a process to be monitored 110 by collecting various data on the process to be monitored 110 in order to detect the occurrence of the abnormality in the process to be monitored 110; a display control unit 121 for controlling the information to be displayed on the CRT display device 130 according to the result of the monitoring operation carried out by the process monitor unit 122; a data transmission unit 123 for outputting the same information as that to be displayed on the CRT display unit 130 to the external of the central monitoring device 120 and inputting signals given from the external of the central monitoring device 120 to the process monitor unit 122; a memory unit 124 for storing various data and programs necessary for the operation of the process monitor unit 122 and the display control unit 121; and a work site operation support unit 127 connected with the process monitor unit 122 and the data transmission unit 123, which will be described in detail below.

In addition, this process monitoring system of FIG. 2 further comprises: a portable monitoring device 170 to be carried by a supervising personnel located at a remote location from the central monitoring device 120 and connected to the central monitoring device 120 through a data transmission line 160 such as a public telephone line; and modulator and demodulator (MODEM) devices 140 and 150 for connecting the data transmission unit 123 of the central monitoring device 120 and the portable monitoring device 170 to the data transmission line 160.

The portable monitoring device 170 is a compact size monitoring device constructed in a form of a portable size personal computer equipped with a built-in display and a keyboard.

Figure 3:
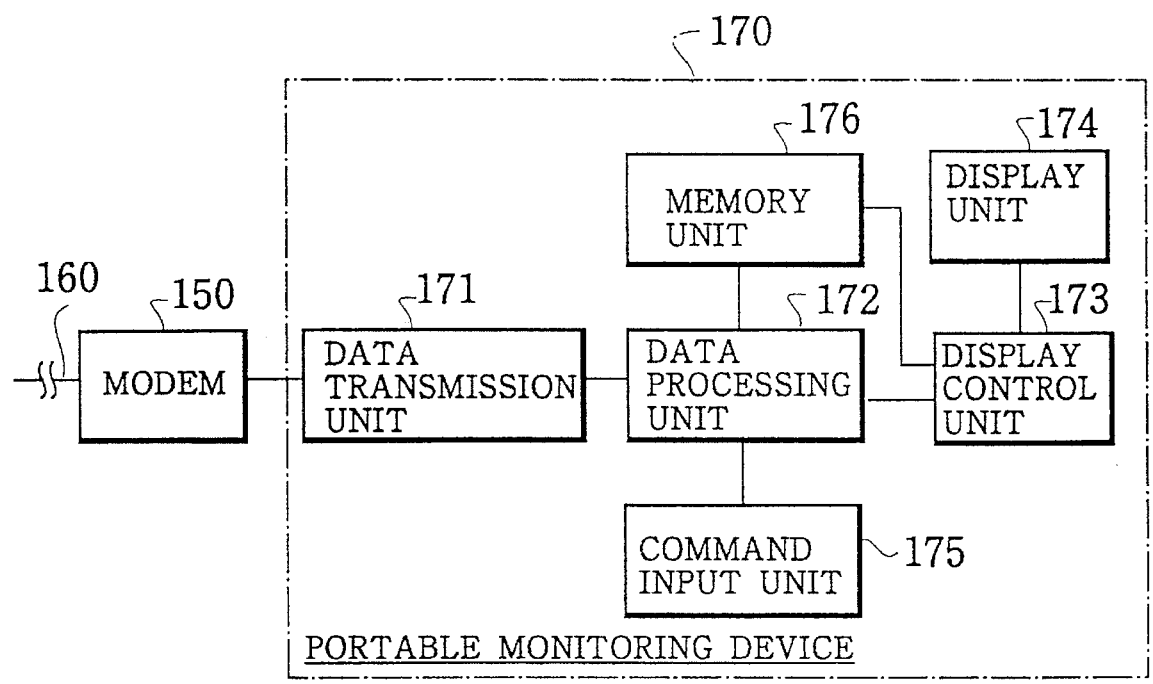
FIG. 3 is a block diagram of a portable monitoring device to be used in the process monitoring system shown in FIG. 2.

More specifically, as shown in FIG. 3, the portable monitoring device further comprises: a data transmission unit 171 for inputting the information received from the central monitoring device 120 by the MODEM device 150 through the data transmission line 180 into the portable monitoring device 170 and outputting signals from the portable monitoring device 170 to the central monitoring device 120; a data processing unit 172 for processing the information inputted from the data transmission unit 171 appropriately to determine the information to be given to the supervising personnel using the portable monitoring device 170 and generating appropriate signals to be transmitted from the portable monitoring device 170 to the central monitoring device 120; a display control unit 173 for controlling the display of the information to be given to the supervising personnel under the control of the data processing unit 172; a display unit 174 such as a liquid crystal display panel for displaying the information to be given to the supervising personnel according to the control by the display control unit 173; a command input unit 175 such as a keyboard for allowing the supervising personnel using the portable monitoring device 170 to enter the desired commands into the data processing unit 172; and a memory unit 176 for storing various data and programs necessary for the operation of the data processing unit 172 and the display control unit 173.

Now, the operation of the process monitoring system of this first embodiment will be described in detail.

First, at the process monitor unit 122 of the central monitoring device 120, the monitoring operation with respect to a process to be monitored 110 is carried out by collecting various data on the process to be monitored 110 in order to detect the occurrence of the abnormality in the process to be monitored 110, while the information necessary to be given to the supervising personnel is displayed on the CRT display device 130 under the control of the display control unit 121.

In a case the occurrence of the abnormality in the process to be monitored 110 is detected by the process monitor unit 122, the information concerning the occurrence of the abnormality in the process to be monitored 110 is displayed on the CRT display device 130, such that the occurrence of the abnormality in the process to be monitored 110 can be notified to the supervising personnel in a case the supervising personnel is present in the central monitoring room.

Meanwhile, the same information concerning the occurrence of the abnormality is also given from the process monitor unit 122 to the data transmission unit 123, where the information is temporarily stored until an access is made from the portable monitoring device 170 through the data transmission line 160.

The supervising personnel who is not present in the central monitoring room and who is located at a remote location from the central monitoring room such as his own home or outdoor field work site is carrying the portable monitoring device 170 and makes an access to the central monitoring device 120 by connecting the portable monitoring device 170 to the data transmission line 160 through the MODEM device 150, just as in a case of an ordinary computer communication, at predetermined timings or any desired timings.

In response to the access made by the portable monitoring device 170, the data transmission unit 123 admits the access to the central monitoring device 120 and the temporarily stored information concerning the occurrence of the abnormality is transmitted to the portable monitoring device 170 through the MODEM devices 140 and 150 and the data transmission line 160.

At the portable monitoring device 170, the information received from the central monitoring device 120 by the MODEM device 150 through the data transmission line 160 is inputted into the portable monitoring device 170 at the data transmission unit 171, and is then appropriately processed at the data processing unit 172 to determine the information to be given to the supervising personnel using the portable monitoring device 170, such that the information to be given to the supervising personnel is displayed on the display unit 174 under the control by the display control unit 173, so as to notify the occurrence of the abnormality in the process to be monitored 110 to the supervising personnel using the portable monitoring device 170.

The supervising personnel using the portable monitoring device 170 then enters the desired commands necessary for the recovery from the abnormality at the command input unit 175, such that these commands are transmitted to the central monitoring device 120 through the data processing unit 172, the data transmission unit 171, the MODEM devices 140 and 150, and the data transmission line 160.

In response, at the central monitoring device 120, the necessary recovery operations are carried out according to the commands given from the supervising personnel using the portable monitoring device 170, so that even the supervising personnel located at a remote location from the central monitoring room can also take care of the abnormality in the process to be monitored 110 appropriately and quickly, according to the information displayed on the display unit 174 of the portable monitoring unit 170.

Now, the work site operation support unit 127 provided in the central monitoring device 120 will be described in detail.

This work site operation support unit 127 realizes a function for enabling a serial execution of the sequential operation of various monitoring target devices involved in the process to be monitored 110 at a time of operating these monitoring target devices at a work site. Here, the operation of the monitoring target devices at the work site can be required in a case of a test running, a device malfunction inspection, a device recovery confirmation, or a confirmation of a normal operation of a linked/automatic control function. In such a case, it has been possible conventionally to confirm the operation of each monitoring target device while precisely comprehending the operation of the other monitoring target devices and related equipments which are distributedly located at distanced locations, only at the central monitoring device 120 which manages all the necessary data. For this reason, it has been impossible conventionally to confirm the linked/automatic control function of the monitoring target devices and related equipments while directly watching a primarily interested monitoring target device at the work site.

As for the remote operation, it has been possible conventionally to realize the remote operation by means of the operation commands from the central monitoring device 120 which is collectively managing all the data, but it has been impossible to realize the operation of other monitoring target devices at other sites from a site of each monitoring target device, because only data available at a site of each monitoring target device are those concerning that each monitoring target device itself, and the states of the other monitoring target devices cannot be known while the related controllability condition cannot be confirmed.

The work site operation support unit 127 resolves these conventional problems by enabling the confirmation of the operation of each monitoring target device at the work site safely and accurately and the comprehension of the states of the other monitoring target devices and related equipments, either manually or automatically, from a work site of each monitoring target device.

Figure 8:
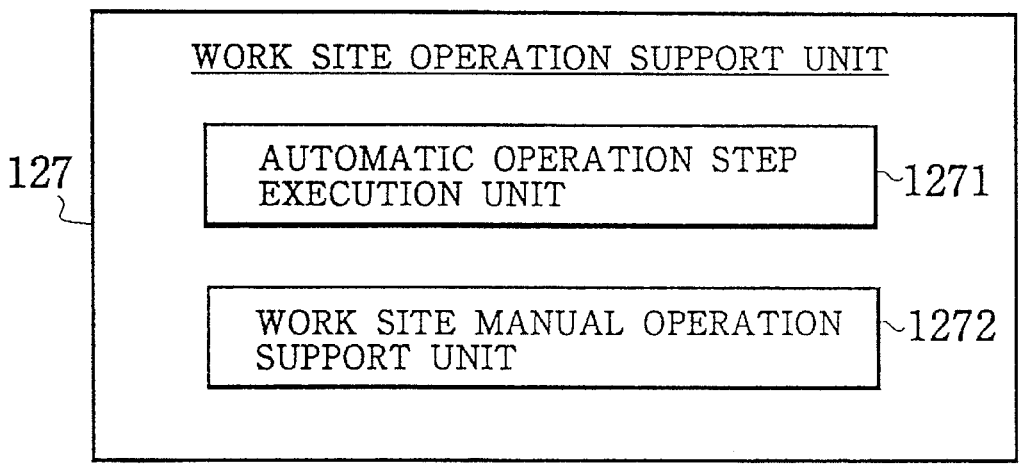
FIG. 8 is a block diagram of a work site operation support unit in the process monitoring system shown in any of FIGS. 2, 4, and 6.

To this end, as shown in FIG. 8, this work site operation support unit 127 includes an automatic operation step execution unit 1271 and a work site manual operation support unit 1272.

Figure 9:
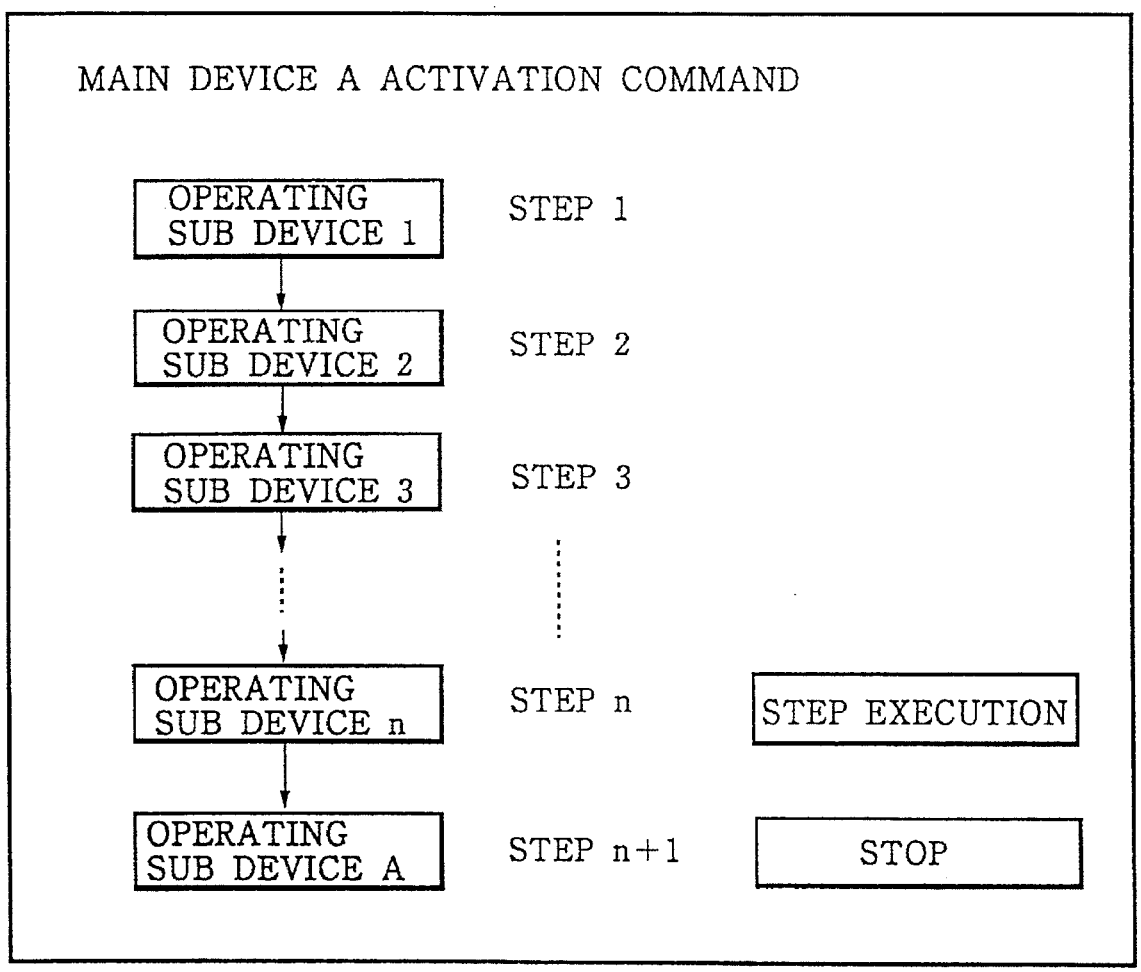
FIG. 9 is an illustration of an exemplary display made by an automatic operation step execution unit in the work site operation support unit of FIG. 8.
Figure 10:
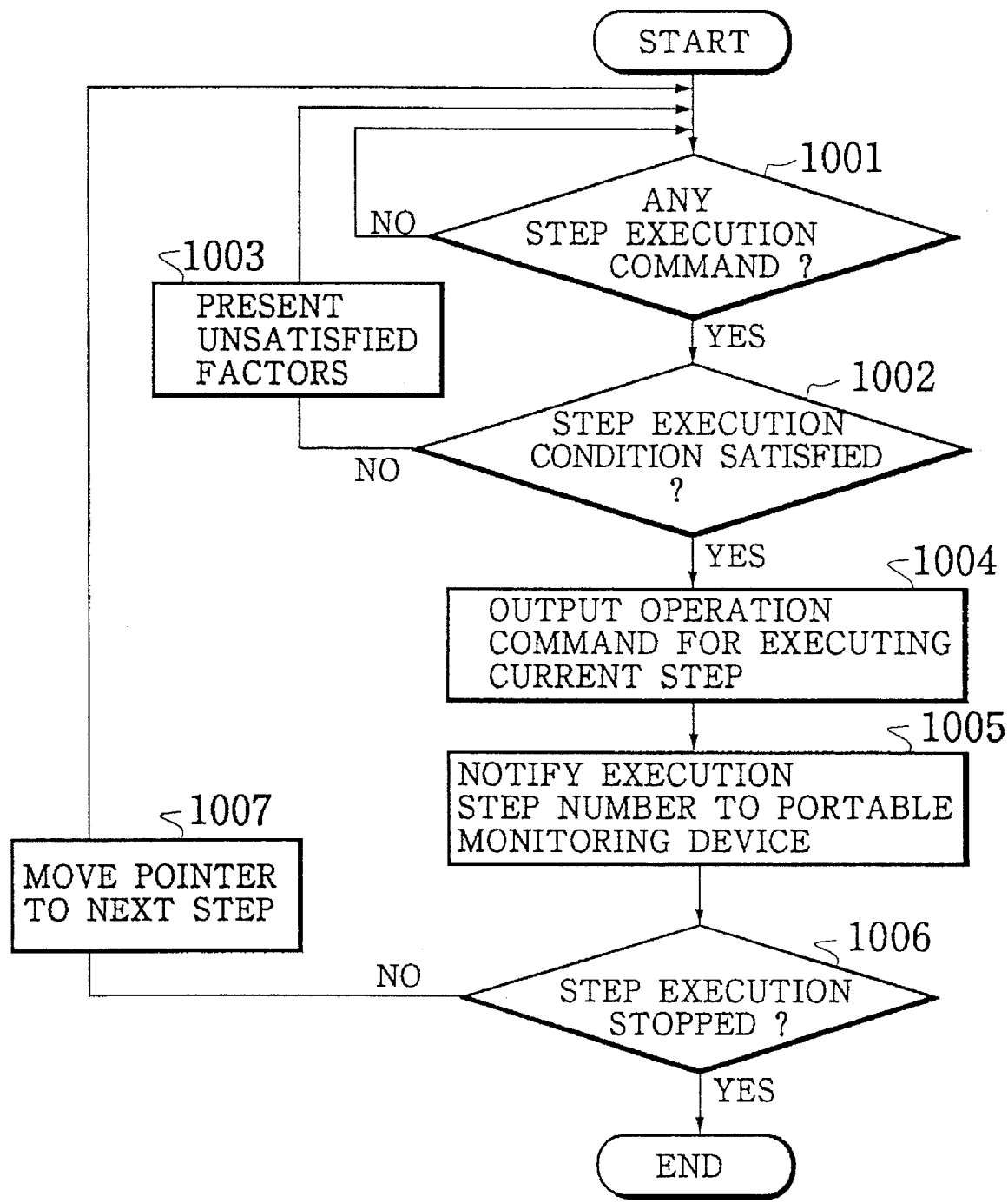
FIG. 10 is a flow chart for the operation of an automatic operation step execution unit in the work site operation support unit of FIG. 8.

The automatic operation step execution unit 1271 realizes a function controlled by the central monitoring device 120 automatically by executing each control stage step by step according to a step execution command from the portable monitoring device 170. Here, an exemplary step execution display screen as shown in FIG. 9 is presented at the portable monitoring device 170, where a bold arrow represents a pointer indicating a current step. The supervising personnel watches this step execution display screen to monitor the states of the monitoring target devices, and when a step execution button is pressed, a step execution command for carrying out the step execution is transmitted to the central monitoring device 120, and the step execution of the automatic control is carried out by the automatic operation step execution unit 1271, according to the flow chart of FIG. 10 as follows.

Namely, whether there is any step execution command or not is judged at the step 1001 first, and whenever the step execution command is received from the portable monitoring device 170, whether a prescribed step execution condition for a current step to be executed is satisfied or not is judged at the step 1002 next.

In a case the step execution condition is not satisfied, unsatisfied factors are presented to the supervising personnel at the step 1003 and the operation returns to the step 1001. At this point, the supervising personnel can remove the unsatisfied factors occurring at the other monitoring target devices by using the work site manual operation support unit 1272 as described below.

On the other hand, in a case the step execution condition is satisfied, the central monitoring device 120 outputs the operation command for executing current step to the relevant monitoring target devices of the step 1004, according to a step execution reference table shown in FIG. 11 in which the monitoring target device to be operated and the corresponding operation command are enlisted for each step. Then, the central monitoring device 120 notifies the execution step number to the portable monitoring device 170 at the step 1005. At this point, the supervising personnel using the portable monitoring device 170 at the work site can concentrate on monitoring of the monitoring target device at that work site, even when the monitoring target device which receives the operation command for the step execution is not present at that work site, because the step execution condition is automatically checked by the central monitoring device 170 at a time of outputting the operation command.

Here, whenever desired, the supervising personnel can stop the execution of that operation command by pressing a stop button on the step execution display screen at the portable monitoring device 170.

At the step 1006, whether the step execution is stopped or not is judged, and unless the step execution is stopped, the pointer is moved to a next step at the step 1007 and the operation returns to the step 1001 for the step execution of the next step.

In this manner, it is possible to carry out the linked/ automatic sequence test at a time of a test running and a normal operation confirmation at a time of a malfunction recovery while the supervising personnel is located at the work site of a primarily interested monitoring target device, so that it becomes possible to accurately confirm the normal operation of the monitoring target device, and the activation of a plant or an inspection for a maintenance purpose can be carried out efficiently and safely.

Figure 13:
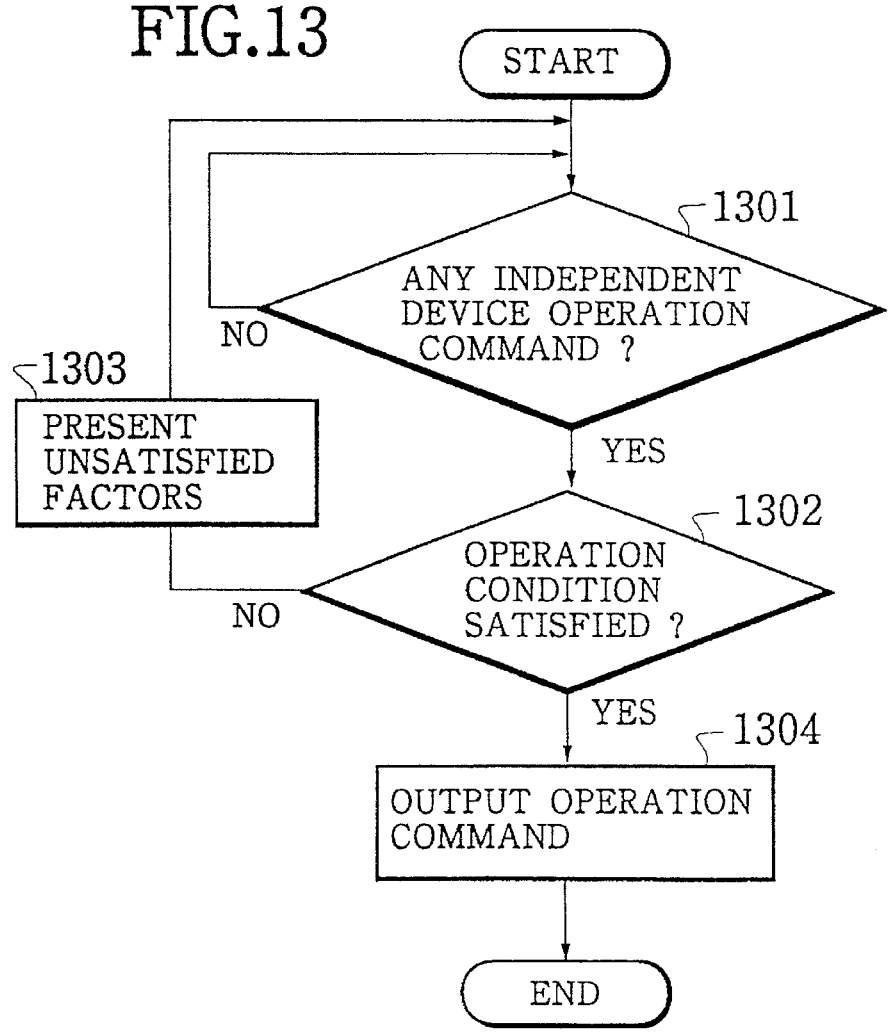
FIG. 13 is a flow chart for the operation of a work site manual operation support unit in the work site operation support unit of FIG. 8.

On the other hand, the work site manual operation support unit 1272 realizes a function for transmitting data on the other monitoring target devices and related equipments that can be influenced by an independent operation of each monitoring target device at each work site, from the central monitoring device 120 to the portable monitoring device 170, whenever each monitoring target device at each work site is manually operated independently. Here, the work site manual operation support unit 1272 operates according to the flow chart of FIG. 13 as follows.

Namely, whether there is any independent device operation command or not is judged at the step 1301 first, and whenever the independent device operation command for a certain monitoring target device is received from the portable monitoring device 170, whether a prescribed device operation condition for that monitoring target device is satisfied or not is judged at the step 1302 next, according to a device operation condition table shown in FIG. 12 in which prescribed conditions for operating each monitoring target device are enlisted for each monitoring target device.

In a case the device operation condition is not satisfied, unsatisfied factors are presented to the supervising personnel at the step 1303 and the operation returns to the step 1301. On the other hand, in a case the device operation condition is satisfied, the central monitoring device 120 outputs the operation command for independently operating that monitoring target device to that monitoring target device at the step 1304.

In this manner, it becomes possible to carry out the independent manual operation of each currently active monitoring target device at each work site in a plant in which monitoring target devices and related equipments are distributed at mutually distanced locations, safely and properly. Here, the device operation condition required in a case of operating each monitoring target device independently is checked by the central monitoring device 120, so that not only the monitoring target device at the work site of the supervising personnel, but also the other monitoring target devices at distanced locations can also be manually operated from each work site, safely and properly. Consequently, the supervising personnel can operate any desired monitoring target device manually to remove the unsatisfied factors occurring at the other monitoring target devices at a time of the step execution, by using this work site manual operation support unit 1272.

Figure 14:
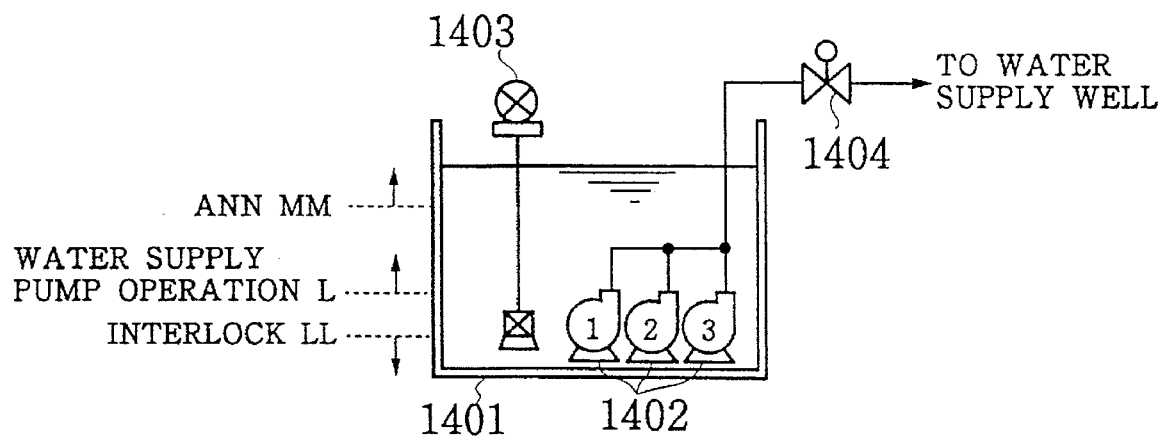
FIG. 14 is a schematic diagram of an exemplary work site at which a supervising personnel can utilize a portable monitoring device of the process monitoring system according to the present invention.

As an example, this work site operation support unit 127 can be utilized in a case shown in FIG. 14 for supplying water by water intake pumps 1402 from a water intake well 1401 at a remote location to a water supply well in an urban water purification plant, where 1403 is a water level sensor and 1404 is a water intake valve, as follows.

Namely, at a time of an operation test of the water intake pumps 1402 at the remote location of the water intake well 1401, it is necessary to know the water level in the water supply well to which the water is to be supplied. To this end, the supervising personnel at the remote location of the water intake well 1401 can operate an intermediate pump which releases the water from the water supply well by means of the work site operation support unit 127 so as to lower the water level of the water supply well initially, and carry out the operation test of the water intake pumps 1402 while monitoring the change of the water level in the water supply well by means of the work site operation support unit 127 so as to confirm the operation of the water intake pumps 1402. In this case, the state of the step execution condition is presented to the supervising personnel by means of a display screen as shown in FIG. 15 for example, at the portable monitoring device 170.

Thus, in this process monitoring system of the first embodiment, it becomes possible to notify the occurrence of the abnormality in the process to be monitored and provide the information concerning the abnormality to the supervising personnel, even when the supervising personnel is located at a remote place distanced from the central monitoring room, by making an access to the central monitoring device 120 from the portable monitoring device 170 carried along by such a supervising personnel through the data transmission line 160.

Consequently, according to this first embodiment of the process monitoring system, it is not necessary for the supervising personnel to be permanently stationed in the central monitoring room and to keep a constant watch over the CRT display device 130, because the supervising personnel can be notified of the occurrence of the abnormality in the process to be monitored 110 and can receive the necessary information concerning the abnormality on the portable monitoring device 170, no matter how far away from the central monitoring room the supervising personnel has been present, as long as he has an access to the data transmission line 160.

Here, it is to be noted that the data transmission line 160 in this embodiment can be either public or dedicated.

In a case of utilizing a public data transmission line for the data transmission between the central monitoring device 120 and the portable monitoring device 170, there is no need to build a specialized data communication network dedicated for this process monitoring system. Moreover, the communication between the central monitoring device 120 and the portable monitoring device 170 is made only when it is necessary, so that the exclusive occupation of the public data transmission line resulting in the prevention of the other users of the public data transmission line will not be caused by this process monitoring system in such a case.

Figure 4:
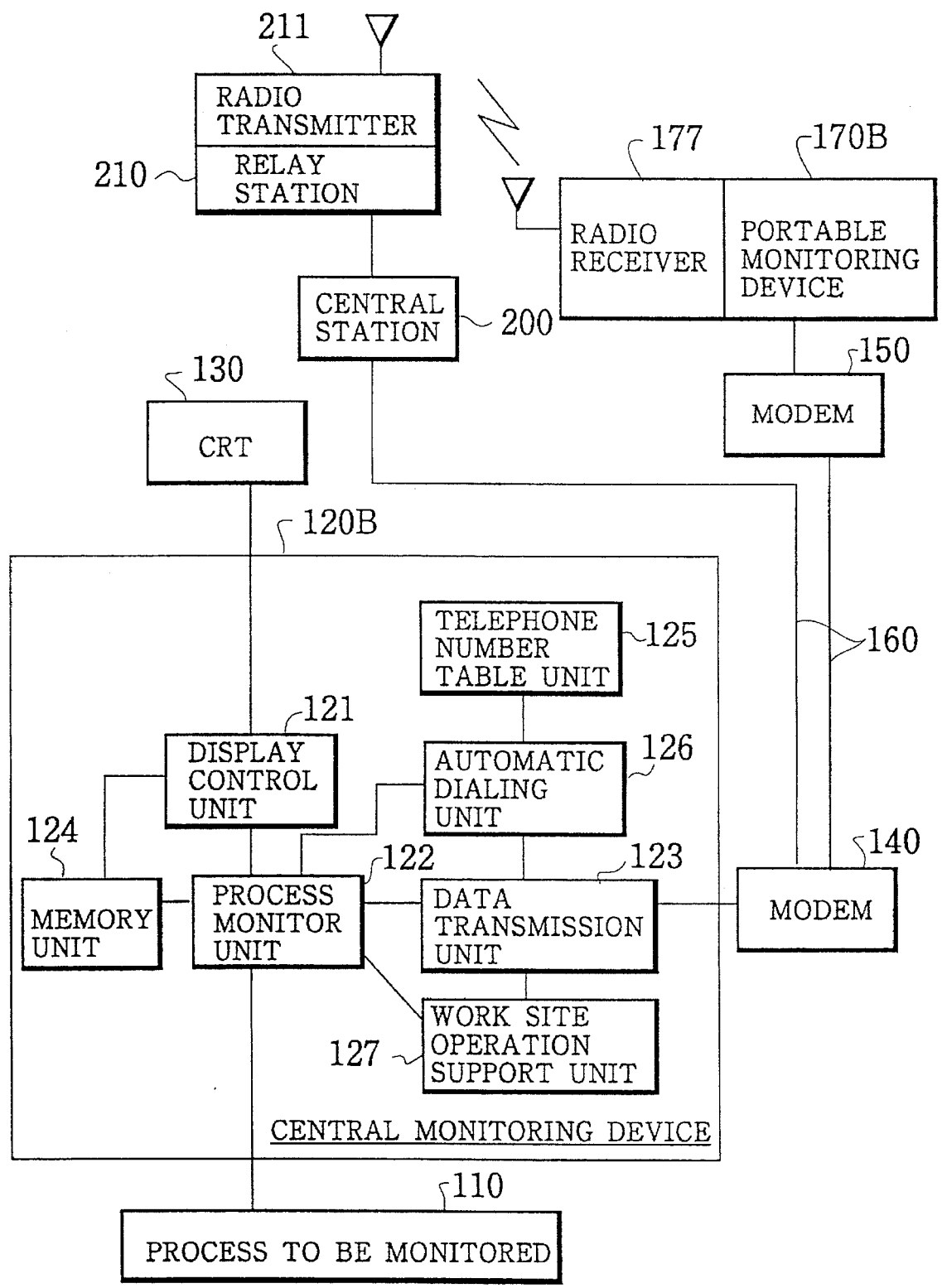
FIG. 4 is a block diagram of a second embodiment of a process monitoring system according to the present invention.

Referring now to FIG. 4, a second embodiment of a process monitoring system according to the present invention will be described in detail. Here, those elements which are equivalent to the corresponding elements in the first embodiment described above will be given the same reference numerals in the drawings, and their description will be omitted.

In this second embodiment of FIG. 4, the notification of the occurrence of the abnormality in the process to be monitored 110 from the central monitoring device 120B to the supervising personnel using the portable monitoring device 170B is realized by utilizing a radio transmission call service network such as a commercially available pocket bell service network. For this reason, the central monitoring device 120B of this second embodiment is also connected to a central radio transmission call service station 200 through the MODEM device 140 and the data transmission line 160. This central radio transmission call service station 200 is connected to a number of relay stations 210 for covering a service area of this radio transmission call service network, such that a call signal requested by the central monitoring device 120B to the central radio transmission call service station 200 is transmitted from a radio transmitter device 211 at the appropriate one of the relay stations 210 to a radio receiver device 177 of the portable monitoring device 170B designated by the request, by the radio transmission.

In conjunction with this, the central monitoring device 120B of this second embodiment comprises: the process monitor unit 122, the display control unit 121, the data transmission unit 123, the memory unit 124, and the work site operation support unit 127 similar to those in the first embodiment described above; a telephone number table unit 125 for memorizing the telephone numbers for making the request of the call signal transmission to the central radio transmission call service station 200; and an automatic dialing unit 126 for automatically dialing an appropriate one of the telephone numbers memorized in the telephone number table unit 125 when the process monitor unit 122 detects the occurrence of the abnormality in the process to be monitored 110.

Figure 5:
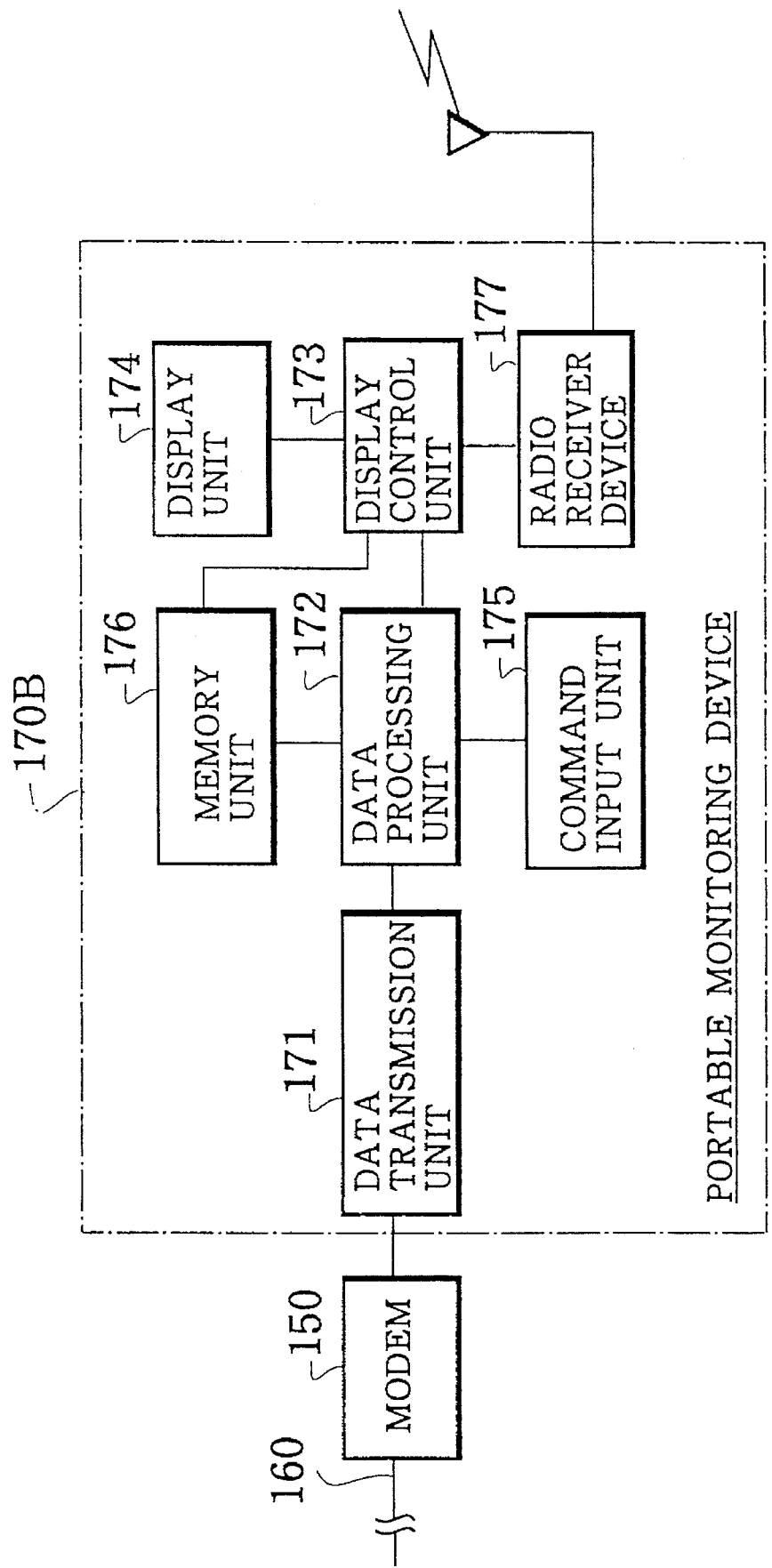
FIG. 5 is a block diagram of a portable monitoring device to be used in the process monitoring system shown in FIG. 4.

Also, as shown in FIG. 5, the portable monitoring device 170B of this second embodiment comprises: the data transmission unit 171, the data processing unit 172, the display control unit 173, the display unit 174, the command input unit 175, and the memory unit 176 similar to those in the first embodiment described above; and a radio receiver device 177 for receiving the call signal from the radio transmitter device 211 of the relay station 210 of the radio transmission call service network, having a built-in speaker for producing an alarm sound in response to the reception of the call signal.

Now the operation of the process monitoring system of this second embodiment will be described in detail.

First, at the process monitor unit 122 of the central monitoring device 120B, the monitoring operation with respect to a process to be monitored 110 is carried out by collecting various data on the process to be monitored 110 in order to detect the occurrence of the abnormality in the process to be monitored 110, while the information necessary to be given to the supervising personnel is displayed on the CRT display device 130 under the control of the display control unit 121.

In a case the occurrence of the abnormality in the process to be monitored 110 is detected by the process monitor unit 122, the information concerning the occurrence of the abnormality in the process to be monitored 110 is displayed on the CRT display device 130, such that the occurrence of the abnormality in the process to be monitored 110 can be notified to the supervising personnel in a case the supervising personnel is present in the central monitoring room.

On the other hand, the same information concerning the occurrence of the abnormality is also given from the process monitor unit 122 to the data transmission unit 123, where the information is temporarily stored until an access is made from the portable monitoring device 170B through the data transmission line 160.

Meanwhile, the process monitor unit 122 controls the automatic dialing unit 126 to dial an appropriate one of the telephone numbers memorized in the telephone number table 125 corresponding to the request for a desired call to the desired portable monitoring device 170B, such that the request for the desired call is automatically made to the central radio transmission call service station 200 from the data transmission unit 123 through the MODEM device 140 and the data transmission line 160.

In response, on the radio transmission call service network side, a call signal requested by the central monitoring device 120B to the central radio transmission call service station 200 is transmitted from the radio transmitter device 211 at the appropriate one of the relay stations 210 to the radio receiver device 177 of the portable monitoring device 170B designated by the request, by the radio transmission.

Then, the radio receiver device 177 of the portable monitoring device 170B produces the alarm sound in response to the reception of the call signal from the built-in speaker, so as to notify the occurrence of the abnormality in the process to be monitored 110 to the supervising personnel, who is not present in the central monitoring room and who is located at a remote location from the central monitoring room such as his own home or outdoor field work site and carrying the portable monitoring device 170B, and to urge the supervising personnel to make an access to the central monitoring device 120B by connecting the portable monitoring device 170B to the data transmission line 160.

In response, the supervising personnel using the portable monitoring device 170B makes an access to the central monitoring device 120B by connecting the portable monitoring device 170B to the data transmission line 160 through the MODEM device 150, just as in a case of an ordinary computer communication.

Then, in response to the access made by the portable monitoring device 170B, the data transmission unit 123 admits the access to the central monitoring device 120B and the temporarily stored information concerning the occurrence of the abnormality is transmitted to the portable monitoring device 170B through the MODEM devices 140 and 150 and the data transmission line 160.

At the portable monitoring device 170B, the information received from the central monitoring device 120B by the MODEM device 150 through the data transmission line 160 is inputted into the portable monitoring device 170B at the data transmission unit 171, and is then appropriately processed at the data processing unit 172 to determine the information to be given to the supervising personnel using the portable monitoring device 170B, such that the information to be given to the supervising personnel is displayed on the display unit 174 under the control by the display control unit 173, so as to provide the necessary information on the abnormality in the process to be monitored 110 to the supervising personnel using the portable monitoring device 170B.

The supervising personnel using the portable monitoring device 170B then enters the desired commands necessary for the recovery from the abnormality at the command input unit 175, such that these commands are transmitted to the central monitoring device 120B through the data processing unit 172, the data transmission unit 171, the MODEM devices 140 and 150, and the data transmission line 160.

In response, at the central monitoring device 120B, the necessary recovery operations are carried out according to the commands given from the supervising personnel using the portable monitoring device 170B, so that even the supervising personnel located at a remote location from the central monitoring room can also take care of the abnormality in the process to be monitored 110 appropriately and quickly, according to the information displayed on the display unit 174 of the portable monitoring unit 170B.

The operation of the work site operation support unit 127 in this second embodiment is essentially similar as in the first embodiment described above.

Thus, in this process monitoring system of the second embodiment, it becomes possible to notify the occurrence of the abnormality in the process to be monitored to the supervising personnel immediately by the radio transmission, even when the supervising personnel is located at a remote place distanced from the central monitoring room, and the information concerning the abnormality can be provided to the supervising personnel by making an access to the central monitoring device 120B from the portable monitoring device 170B carried along by such a supervising personnel through the data transmission line 160.

Consequently, according to this second embodiment, it is not necessary for the supervising personnel to be permanently stationed in the central monitoring room and to keep a constant watch over the CRT display device 130, because the supervising personnel can be notified of the occurrence of the abnormality in the process to be monitored 110 and can receive the necessary information concerning the abnormality on the portable monitoring device 170B, no matter how far away from the central monitoring room the supervising personnel has been present, as long as he has an access to the data transmission line 160 and he is within the service area of the radio transmission call service network.

Here, it is to be noted that either one or both of the data transmission line 160 and the radio transmission call service network in this embodiment can be either public or dedicated.

In a case of utilizing a public radio transmission call service network and a public data transmission line for the data transmission between the central monitoring device 120B and the portable monitoring device 170B, there is no need to build a specialized data communication network dedicated for this process monitoring system. Moreover, the communication between the central monitoring device 120B and the portable monitoring device 170B is made only when it is necessary, so that the exclusive occupation of the public radio transmission call service network and the public data transmission line resulting in the prevention of the other users of the public radio transmission call service network and the public data transmission line will not be caused by this process monitoring system in such a case.

Figure 6:
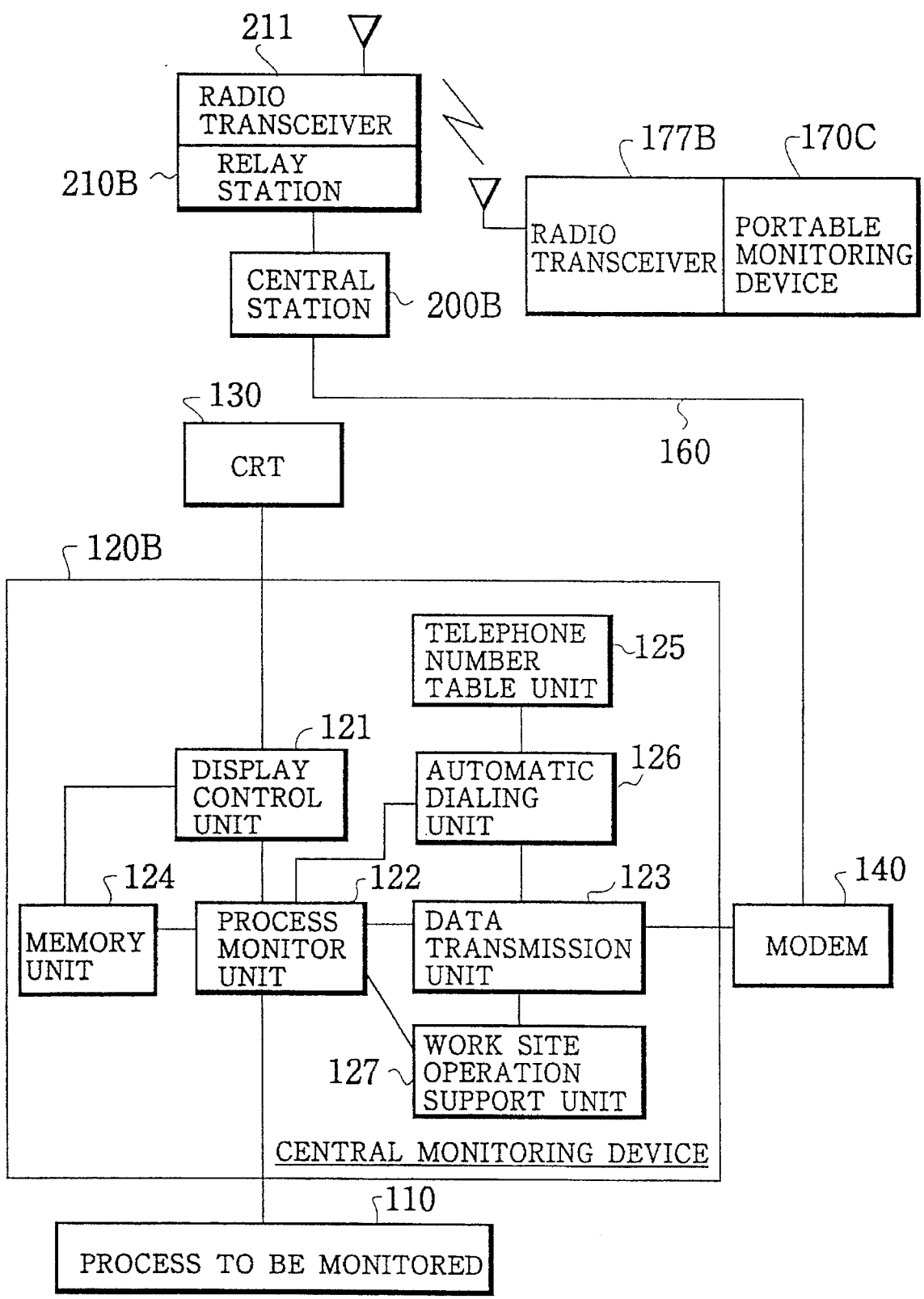
FIG. 6 is a block diagram of a third embodiment of a process monitoring system according to the present invention.

Referring now to FIG. 6, a third embodiment of a process monitoring system according to the present invention will be described in detail. Here, those elements which are equivalent to the corresponding elements in the first and second embodiments described above will be given the same reference numerals in the drawings, and their description will be omitted.

In this third embodiment of FIG. 6, all the communication between the central monitoring device 120B and the portable monitoring device 170C including not only the notification of the occurrence of the abnormality in the process to be monitored 110 but also the transmission of the information concerning the abnormality from the central monitoring device 120B to the portable monitoring device 170C as well as the transmission of the commands for recovery operations from the portable monitoring device 170C to the central monitoring device 120B are realized by utilizing a radio transmission data communication service network. For this reason, the central monitoring device 120B of this third embodiment is also connected to a central radio transmission data communication service station 200B through the MODEM device 140 and the data transmission line 160. This central radio transmission data communication service station 200B is connected to a number of relay stations 210B for covering a service area of this radio transmission data communication service network, through either data transmission lines or its own data transmission lines, such that data signals requested by the central monitoring device 120B to the central radio transmission data communication service station 200B are transmitted from a radio transceiver device 211B at the appropriate one of the relay stations 210B to a radio transceiver device 177B of the portable monitoring device 170C designated by the request, by the radio transmission.

In this case, the telephone number table unit 125 of the central monitoring device 120B of this third embodiment memorizes the telephone numbers for making the request of the data signal transmission to the central radio transmission data communication service station 200B, such that the automatic dialing unit 126 can automatically dial an appropriate one of the telephone numbers memorized in the telephone number table unit 125 when the process monitor unit 122 detects the occurrence of the abnormality in the process to be monitored 110.

Figure 7:
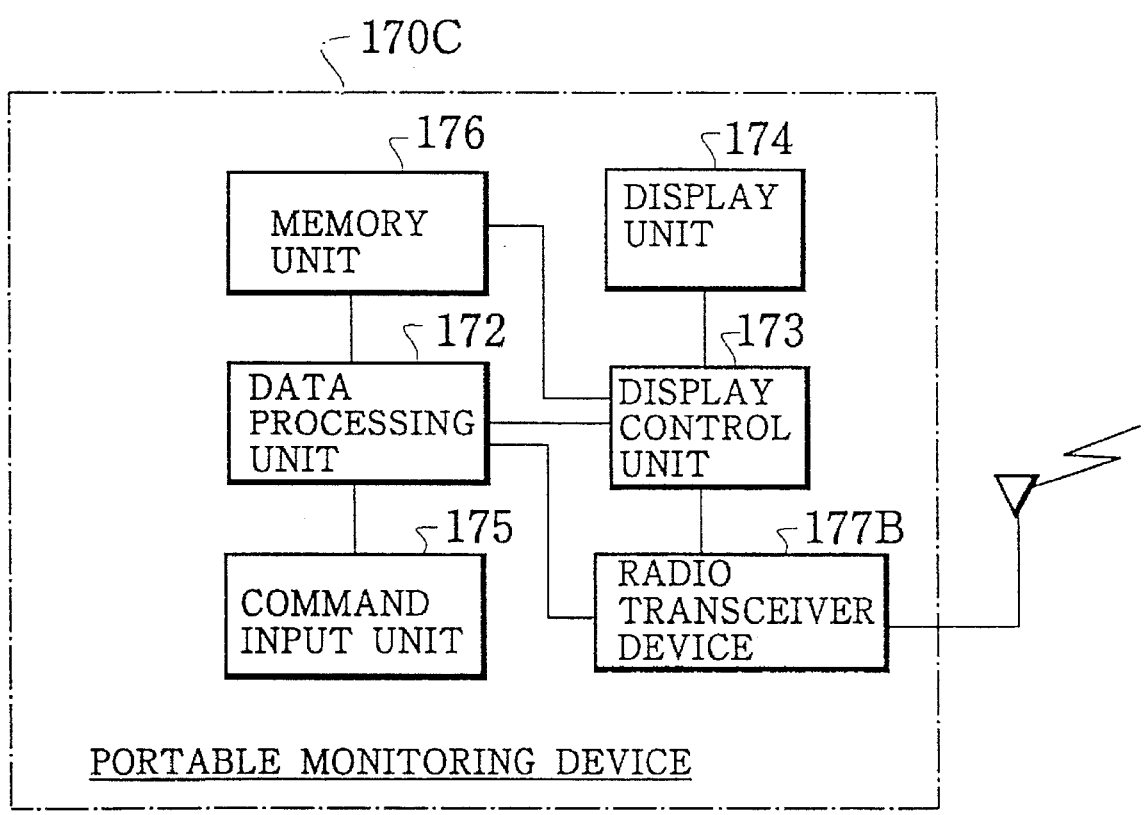
FIG. 7 is a block diagram of a portable monitoring device to be used in the process monitoring system shown in FIG. 6.

Also, as shown in FIG. 7, the portable monitoring device 170C of this third embodiment comprises: the data processing unit 172, the display control unit 173, the display unit 174, the command input unit 175, and the memory unit 176 similar to those in the first embodiment described above; and a radio transceiver device 177B for receiving the data signals from the radio transceiver device 211B of the relay station 210B of the radio transmission data communication service network, having a built-in speaker for producing an alarm sound in response to the initial reception of the call signals, and for transmitting desired data signals to the radio transceiver device 211B of the relay station 210B of the radio transmission data communication service network.

Now, the operation of the process monitoring system of this third embodiment will be described in detail.

First, at the process monitor unit 122 of the central monitoring device 120B, the monitoring operation with respect to a process to be monitored 110 is carried out by collecting various data on the process to be monitored 110 in order to detect the occurrence of the abnormality in the process to be monitored 110, while the information necessary to be given to the supervising personnel is displayed on the CRT display device 130 under the control of the display control unit 121.

In a case the occurrence of the abnormality in the process to be monitored 110 is detected by the process monitor unit 122, the information concerning the occurrence of the abnormality in the process to be monitored 110 is displayed on the CRT display device 130, such that the occurrence of the abnormality in the process to be monitored 110 can be notified to the supervising personnel in a case the supervising personnel is present in the central monitoring room.

On the other hand, the same information concerning the occurrence of the abnormality is also given from the process monitor unit 122 to the data transmission unit 123, where the information is temporarily stored until an access to the central radio transmission data communication service station 220B through the data transmission line 160.

Meanwhile, the process monitor unit 122 controls the automatic dialing unit 126 to dial an appropriate one of the telephone numbers memorized in the telephone number table 125 corresponding to the request for a desired transmission of the desired data signals including the temporarily stored information to the desired portable monitoring device 170B, such that the request for the desired data signal transmission is automatically made to the central radio transmission data communication service station 200B from the data transmission unit 123 through the MODEM device 140 and the data transmission line 160.

In response, on the radio transmission data communication service network side, the data signals requested by the central monitoring device 120B to the central radio transmission data communication service station 200B are transmitted from the radio transceiver device 211B at the appropriate one of the relay stations 210B to the radio transceiver device 177B of the portable monitoring device 170C designated by the request, by the radio transmission.

Then, the radio transceiver device 177B of the portable monitoring device 170C produces the alarm sound in response to the initial reception of the data signals from the built-in speaker, so as to notify the occurrence of the abnormality in the process to be monitored 110 to the supervising personnel, who is not present in the central monitoring room and who is located at a remote location from the central monitoring room such as his own home or outdoor field work site and carrying the portable monitoring device 170C.

Also, at the portable monitoring device 170C, the information received from the central monitoring device 120B through the radio transmission data communication service network is appropriately processed at the data processing unit 172 to determine the information to be given to the supervising personnel using the portable monitoring device 170C, such that the information to be given to the supervising personnel is displayed on the display unit 174 under the control by the display control unit 173, so as to provide the necessary information on the abnormality in the process to be monitored 110 to the supervising personnel using the portable monitoring device 170C.

The supervising personnel using the portable monitoring device 170C then enters the desired commands necessary for the recovery from the abnormality at the command input unit 175, such that these commands are transmitted to the central monitoring device 120B from the radio transceiver device 177B to the central monitoring device 120B through the radio transmission data communication service network.

In response, at the central monitoring device 120B, the necessary recovery operations are carried out according to the commands given from the supervising personnel using the portable monitoring device 170C, so that even the supervising personnel located at a remote location from the central monitoring room can also take care of the abnormality in the process to be monitored 110 appropriately and quickly, according to the information displayed on the display unit 174 of the portable monitoring unit 170C.

The operation of the work site operation support unit 127 in this third embodiment is essentially similar as in the first embodiment described above.

Thus, in this process monitoring system of the third embodiment, it becomes possible to notify the occurrence of the abnormality in the process to be monitored and to provide the information on the abnormality to the supervising personnel immediately by the radio transmission using the radio transmission data communication service network, even when the supervising personnel is located at a remote place distanced from the central monitoring room.

Consequently, according to this third embodiment, it is not necessary for the supervising personnel to be permanently stationed in the central monitoring room and to keep a constant watch over the CRT display device 130, because the supervising personnel can be notified of the occurrence of the abnormality in the process to be monitored 110 and receive the necessary information concerning the abnormality on the portable monitoring device 170C, no matter how far away from the central monitoring room the supervising personnel has been present, as long as he is within the service area of the radio transmission data communication service network.

Here, it is to be noted that either one or both of the data transmission line 160 and the radio transmission data communication service network in this embodiment can be either public or dedicated.

In a case of utilizing a public radio transmission data communication service network in the data transmission between the central monitoring device 120B and the portable monitoring device 170C, there is no need to build a specialized data communication network dedicated for this process monitoring system. Moreover, the communication between the central monitoring device 120B and the portable monitoring device 170C is made only when it is necessary, so that the exclusive occupation of the public radio transmission data communication service network resulting in the prevention of the other users of the public radio transmission data communication service network will not be caused by this process monitoring system in such a case.

It is to be noted that, in the embodiments described above, in addition to the data transmission between the central monitoring device and the portable monitoring device at a time of the occurrence of the abnormality in the process to be monitored, the further data transmission between the central monitoring device and the portable monitoring device may be made at regular intervals, regardless of the state of the process to be monitored.

It is also to be noted that the embodiments described above may be modified such that a plurality of portable monitoring devices used by a plurality of supervising personnels can communicate with each other in a manner similar to the communication between the central monitoring device and each portable monitoring device, if desired.

It is further to be noted that many modifications and variations of the above embodiments may be made without departing from the novel and advantageous features of the present invention. Accordingly, all such modifications and variations are intended to be included within the scope of the appended claims.

What is claimed is:

1. A process monitoring system, comprising:
    a central monitoring device for monitoring a state of a process to be monitored, which outputs a notification of an occurrence of abnormality in the process to be monitored and information on the abnormality when the occurrence of the abnormality in the process to be monitored is detected;
    a display means, located in a central process monitoring room, for displaying the notification and the information outputted by the central monitoring device; and
    a portable monitoring device, to be carried by a supervising personnel located at a remote location from the central process monitoring room and connected wish the central monitoring device through a data transmission path, for receiving the notification and the information outputted by the central monitoring device at the remote location and transmitting an operation command for operating monitoring target devices involved in the process to be monitored, including those monitoring target devices which are distanced from the remote location, through the data transmission path;
    wherein the central monitoring device includes:
        automatic operation step execution means for executing an automatic operation of the monitoring target devices step by step while checking a prescribed step execution condition for each step, in response to the operation command transmitted from the portable monitoring device; and
        work site manual operation support means for executing an independent manual operation of each monitoring target device while checking a prescribed device operation condition for each monitoring target device, in response to the operation command transmitted from the portable monitoring device.

2. The system of claim 1, wherein the data transmission path comprises data transmission lines for realizing an on-line transmission of the notification and the information outputted by the central monitoring device.

3. The system of claim 2, further including modem means for allowing the central monitoring device and the portable monitoring device include means to make an access to the data transmission lines.

4. The system of claim 1, wherein the data transmission path comprises a radio transmission call service network for realizing a radio transmission of the notification outputted by the central monitoring device in a form of a call signal, and data transmission lines for realizing an on-line transmission of the information outputted by the central monitoring device in a form of data signals.

5. The system of claim 4, wherein the central monitoring device includes dialing means for making an access to the radio transmission call service network, the portable monitoring device includes radio receiver means for receiving the call signal from the radio transmission call service network, and the system further includes modem means for allowing the central monitoring device and the portable monitoring device to make an access to the data transmission lines.

6. The system of claim 1, wherein the data transmission path comprises a radio transmission data communication service network for realizing a radio transmission of the notification and the information outputted by the central monitoring device in a form of data signals.

7. The system of claim 6, wherein the central monitoring device includes dialing means for making an access to the radio transmission data communication service network, and the portable monitoring device includes radio transceiver means for making an access to the radio transmission data communication service network.

8. The system of claim 1, wherein the portable monitoring device includes means for generating an alarm sound in response to a reception of the notification received from the central monitoring device through the data transmission path.

9. The system of claim 1, wherein the portable monitoring device includes display means for displaying the information received from the central monitoring device at the remote location through the data transmission path.

10. The system of claim 1, wherein the portable monitoring device includes command input means for allowing the supervising personnel to enter desired commands in response to the notification and the information received from the central monitoring device, the desired commands entered at the command input means being transmitted to the central monitoring device through the data transmission path.

11. A method of process monitoring, comprising the steps of:
    monitoring a process to be monitored by central monitoring device for monitoring a state of the process to be monitored;
    outputting a notification of an occurrence of abnormality in the process to be monitored and information on the abnormality from the central monitoring device when the occurrence of the abnormality in the process to be monitored is detected by the central monitoring device;
    displaying the notification and the information outputted from the central monitoring device on display means located in a central process monitoring room;
    providing a portable monitoring device to be carried by a supervising personnel located at a remote location from the central process monitoring room and connected with the central monitoring device through a data transmission path, for receiving the notification and the information outputted by the central monitoring device; and
    receiving the notification and the information outputted from the central monitoring device by the portable monitoring device at the remote location through the data transmission path;
    transmitting an operation command for operating monitoring target devices involved in the process to be monitored, including those monitoring target devices which are distanced from the remote location, from the portable monitoring device through the data transmission path;
    executing at least one of an automatic operation of the monitoring target devices step by step while checking a prescribed step execution condition for each step, and an independent manual operation of each monitoring target device while checking a prescribed device operation condition for each monitoring target device, at the central monitoring device, in response to the operation command transmitted from the portable monitoring device.

12. The method of claim 11, wherein at the providing step, the data transmission path comprises data transmission lines for realizing an on-line transmission of the notification and the information outputted by the central monitoring device.

13. The method of claim 12, wherein at the receiving step, the notification and the information outputted from the central monitoring device are transmitted to the portable monitoring device through modem means for allowing the central monitoring device and the portable monitoring device to make an access to the data transmission lines.

14. The method of claim 11, wherein at the providing step, the data transmission path comprises a radio transmission call service network for realizing a radio transmission of the notification outputted by the central monitoring device in a form of a call signal, and data transmission lines for realizing an on-line transmission of the information outputted by the central monitoring device in a form of data signals.

15. The method of claim 14, wherein at the receiving step, the notification outputted from the central monitoring device is transmitted to the portable monitoring device through dialing means for allowing the central monitoring device to make an access to the radio transmission call service network and radio receiver means for receiving the call signal from the radio transmission call service network, while the information outputted from the central monitoring device is transmitted to the portable monitoring device through modem means for allowing the central monitoring device and the portable monitoring device to make an access to the data transmission lines.

16. The method of claim 11, wherein at the providing step, the data transmission path comprises a radio transmission data communication service network for realizing a radio transmission of the notification and the information outputted by the central monitoring device in a form of data signals.

17. The method of claim 16, wherein at the receiving step, the notification and the information outputted from the central monitoring device are transmitted to the portable monitoring device through dialing means for allowing the central monitoring device to make an access to the radio transmission data communication service network and radio transceiver means for allowing the portable monitoring device to make an access to the radio transmission data communication service network.

18. The method of claim 11, further comprising the step of generating an alarm sound at the portable monitoring device in response to a reception of the notification received from the central monitoring device through the data transmission path.

19. The method of claim 11, further comprising the step of displaying the information received from the central monitoring device at the remote location through the data transmission path on display means provided on the portable monitoring device.

20. The method of claim 11, further comprising the steps of:

allowing the supervising personnel to enter desired commands from command input means provided on the portable monitoring device in response to the notification and the information received from the central monitoring device; and transmitting the desired commands entered at the command input means to the central monitoring device through the data transmission path.

* * * * *